United States Patent
Jacob (Yaakov) et al.

(10) Patent No.: US 8,473,679 B2
(45) Date of Patent: Jun. 25, 2013

(54) SYSTEM, DATA STRUCTURE, AND METHOD FOR COLLAPSING MULTI-DIMENSIONAL DATA

(75) Inventors: Jeffrey Allan (Alon) Jacob (Yaakov), Raanana (IL); Adar Paz, Tel-Aviv (IL); Yaniv Gatot, Kfar-Daniyel (IL); Roni M. Sadeh, Kfar Saba (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 307 days.

(21) Appl. No.: 13/077,062

(22) Filed: Mar. 31, 2011

(65) Prior Publication Data

US 2012/0254573 A1    Oct. 4, 2012

(51) Int. Cl.
*G06F 13/40* (2006.01)

(52) U.S. Cl.
USPC ........... 711/117; 711/112; 711/161; 711/165; 710/68

(58) Field of Classification Search
USPC ............... 710/68; 711/112, 117, 161, 165
See application file for complete search history.

(56) References Cited

U.S. PATENT DOCUMENTS

| | | | | |
|---|---|---|---|---|
| 4,638,424 A | * | 1/1987 | Beglin et al. | 711/117 |
| 5,751,883 A | * | 5/1998 | Ottesen et al. | 386/345 |
| 2001/0016893 A1 | * | 8/2001 | Merritt | 711/1 |
| 2001/0047451 A1 | * | 11/2001 | Noble et al. | 711/111 |
| 2005/0256884 A1 | * | 11/2005 | Arnold et al. | 707/10 |
| 2005/0286529 A1 | * | 12/2005 | Arulambalam et al. | 370/395.1 |

* cited by examiner

*Primary Examiner* — Jae Yu
(74) *Attorney, Agent, or Firm* — Pearl Cohen Zedek Latzer, LLP (57) ABSTRACT

A system and method of data transfer that collapses a multi-dimensional data array while preserving neighboring connectivity. One or more program instructions may be received that request input data comprising a sub-set of data elements from a first data array in an external memory. The sub-set of data elements may be transferred from the first data array in the external memory to a second data array in an internal memory. The retrieved sub-set of requested data elements may be stored in the second array in respective positions translated from the positions in the first array by a plurality of omitted rows and columns from the first data array from which no data elements are requested.

18 Claims, 3 Drawing Sheets

SYSTEM, DATA STRUCTURE, AND METHOD FOR COLLAPSING MULTI-DIMENSIONAL DATA

BACKGROUND OF THE INVENTION

The present invention relates to video and image applications, and more particularly to a method for compressing or collapsing multiple dimensional data, for example, in video and imaging applications.

Video and imaging applications may store image and video data in a main external computer memory. The video and imaging data may include a multi-dimensional data array defining pixel values for a corresponding array of pixels in an image. Each data element in the array may have a value uniquely associated with a pixel in the same coordinate location in the pixel array of the image or video frame. Each data array may represent a visual feature, such as, color, texture, or hue, of the pixel array.

Video or image data may be transferred from the main external computer memory to an internal local memory for image processing. In some cases, only a subset of the pixel data may be requested. Therefore, loading an entire data array for the whole image may be inefficient and may waste a great amount of memory bandwidth to retrieve data and a great amount of internal memory space to store data that may never be used.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. Specific embodiments of the present invention will be described with reference to the following drawings, wherein:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

A digital image may include a multi-dimensional grid or array of pixels. The array of pixels may be represented by one or more corresponding multi-dimensional grid or arrays of data elements. Each array may define a visual feature, such as color or texture, of the pixels in the image. Each data element in an array may uniquely correspond to a pixel in the image, for example, by a one-to-one correspondence. The multi-dimensional data array may be divided into blocks or sub-arrays, each spanning multiple rows and columns. Groups of data elements may be retrieved from the data array and stored, together, in data blocks.

The image data may be stored in an external memory unit, such as, a disk drive, graphics card, input device port, network card, main computer memory or other memory external to a device or integrated circuit. A direct memory access (DMA) controller or other processing or control unit making block transfers to/from memory may transfer the image data from the external memory unit to an internal memory unit, for example, for image processing.

Conventional systems may retrieve complete data arrays, for example, element by element and row by row, for example, in sequential blocks, until the entire data array storing values for a whole image is retrieved. However, the input for an image processing program may be, for example, a few randomly positioned data elements from an array, not the entire array. In one example, a program instruction may request, as input, data elements corresponding to a subset of non-consecutive or non-neighboring pixels, such as, pixels 1, 2, 10, 12, 12, 10, 20, . . . , in an image. Retrieving the entire array may waste memory bandwidth to retrieve non-requested data elements as well as internal memory space to store the non-requested data elements, such as for, pixels 3-9, 11, 13-19, etc, that may never be used.

To efficiently target the desired pixels, some systems separately retrieve individually requested data elements. Although such systems obtain low memory size by storing only the requested pixel data, since each memory access uses a significant amount of system overhead, these systems increase the number of memory accesses and therefore, increase the system overhead to retrieve individual pixel data separately.

To solve this problem, some systems may retrieve data elements from the external memory in blocks of a plurality of pixels to decrease the number of memory accesses and thus the system overhead. The block size may correspond to, for example, the size of a burst on a memory bus. Systems may access a sub-set of desired or targeted blocks that include groups of requested pixel data (as well as some non-requested data) to reduce individual memory accesses. This method of retrieving targeted data blocks may be, referred to as "cherry picking." Although this method may increase memory size as compared to storing individually retrieved pixels, this method may reduce overall system overhead.

However, when the targeted blocks are positioned at non-consecutive or non-neighboring locations in the data array in external memory, retrieving those individual targeted blocks may remove information about the placement of neighboring requested pixels in adjacent blocks. Accordingly, additional information is needed to keep track of the location of each block within the internal memory in order to "stitch together" position information for neighboring pixels.

To provide the position information for neighboring pixels or data blocks, embodiments of the invention may store the targeted retrieved data blocks in internal memory in the same relative positions as they are stored in external memory. A targeted array may be generated in internal memory to store the retrieved targeted data blocks in array slots according to their slot position in the initial array in external memory and may leave the remaining slots between the retrieved blocks empty. These empty slots may be empty to avoid the wasteful task of retrieving and storing data blocks that will never be used, while benefitting from the spacing and gaps the empty slots provide, separating the retrieved blocks into their correct relative locations thereby retaining the correct neighboring pixel information in the internal memory.

Since the targeted array preserves neighboring pixel locations for requested data elements, program instruction(s) that input strings of the requested data elements that stretch across multiple adjacent blocks in the external memory may operate directly on the targeted array in internal memory which has the same formation of the multiple adjacent requested blocks.

Although it may be important to preserve adjacent requested blocks in the targeted array, when an entire row or column of the targeted array is empty, the slots for the empty row or column may be removed without distorting the relative positions of neighboring requested data blocks. A targeted array may be collapsed or compressed by removing empty rows and columns, which may be referred to as, for example, a "collapsed" data array. Although the retrieved data blocks in a collapsed array may be moved closer together by removing empty rows and columns, all initially neighboring requested pixel elements may retain their same neighboring formation as in the original external memory.

A look-up table may indicate the translation of row and columns from the initial array in the external memory to the collapsed array in the internal memory. The look-up table may be used to find the internal memory location of a data element from the element's external memory location. To a processor operating on the sub-set of requested pixels and using the translations in the look-up table, the collapsed array in internal memory (storing only data blocks containing that sub-set of requested pixel data) may appear identical to the initial array in external memory, for transparent data processing.

Retrieving only targeted data blocks with requested data elements may use optimal memory bandwidth, while storing additional empty data slots with those data blocks in a targeted or collapsed array may use extra internal memory resources. However, the empty data slots of the collapsed array may preserve neighboring pixel formations to simplify the operations of processors operating across neighboring data blocks and hence provide higher and more efficient performance. The benefit of higher performance of the collapsed array may outweigh the additional internal memory expense for storing empty slots in the array for an overall more efficient system.

Figure 1:
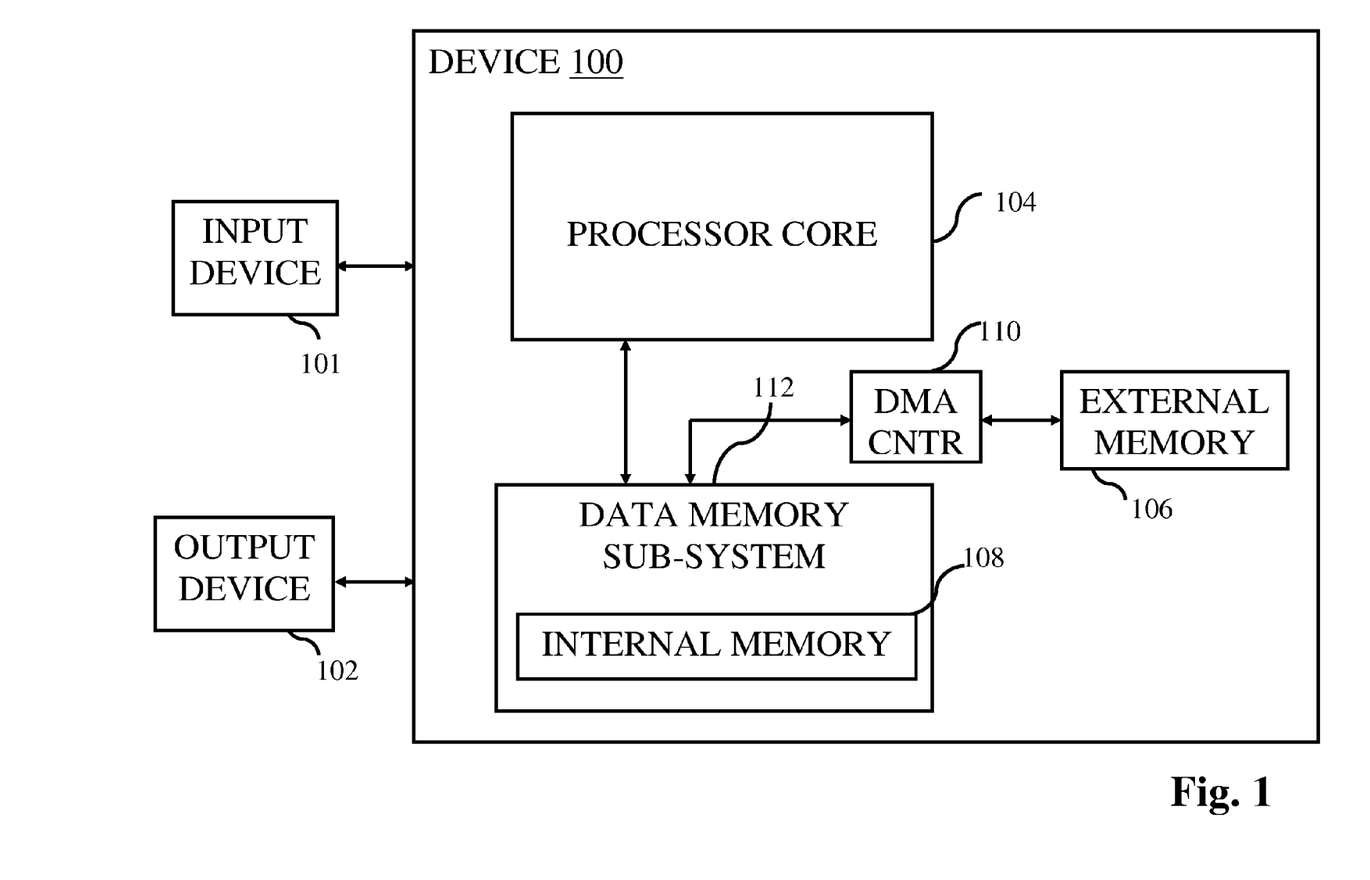
FIG. 1 is a schematic illustration of a system in accordance with embodiments of the invention.

Reference is made to FIG. 1, which is a schematic illustration of an exemplary device according to embodiments of the invention.

Device 100 may include, or may be part of, a computer device, video or image capture or playback device, cellular device, or any other digital device such as a cellular telephone, personal digital assistant (PDA), video game console, etc. Device 100 may include any device capable of executing a series of instructions to record, save, store, process, edit, display, project, receive, transfer, or otherwise use or manipulate video or image data.

Device 100 may include an input device 101. When device 100 includes recording capabilities, input device 101 may include an imaging device such as a camcorder including an imager, one or more lens(es), prisms, or minors, etc. to capture images of physical objects via the reflection of light waves therefrom and/or an audio recording device including an audio recorder, a microphone, etc., to record the projection of sound waves thereto. When device 100 includes image processing capabilities, input device 101 may include a pointing device, click-wheel or mouse, keys, touch screen, recorder/microphone using voice recognition, other input components for a user to control, modify, or select from video or image processing operations.

Device 100 may include an output device 102 (for example, a monitor, projector, screen, printer, or display) for displaying video or image data on a user interface according to a sequence of instructions executed by a processor core 104 in device 100.

Processor core 104 may include a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multi-purpose or specific processor or controller.

Device 100 may include an external (main) memory 106 and an internal (local) memory 108. Internal memory unit 108 may be a memory unit directly accessible to processor core 104 or internal to (physically attached or stored within) a data memory sub-system 112, which is in turn directly accessible to processor core 104. Internal memory unit 108 may be a short-term memory unit, while external memory unit 106 may be a long-term memory unit; however, either of these memories may be long-term or short-term memory units. External memory 106 may be a main memory and may include non-volatile memory, flash memory, one or more external drivers, such as, for example, a disk or tape drive, graphics card, input/output device 101,102 port, network card or a memory in an external device such as the video, audio, and/or image recorder. Internal memory unit 108 may include, for example, random access memory (RAM), dynamic RAM (DRAM), cache memory, buffer memory, volatile memory, scratchpad memory, or other suitable memory units or storage units for direct use by processor core 104. Internal memory unit 108 and external memory unit 106 may be implemented as separate (for example, "off-chip") or integrated (for example, "on-chip") memory units. In some embodiments in which there is a multi-level memory or a memory hierarchy, external memory unit 106 may be off-chip and internal memory unit 108 may be on-chip. For example, internal memory unit 108 may include a tightly-coupled memory (TCM), a buffer, or a cache, such as, an L-1 cache or an L-2 cache. An L-1 cache may be relatively more integrated with processor core 104 than an L-2 cache and may run at the processor clock rate whereas an L-2 cache may be relatively less integrated with processor core 104 than the L-1 cache and may run at a different rate than the processor clock rate. Other or additional memory architectures may be used.

Processor core 104 may use a direct memory access (DMA) controller 110 to read, write, and/or transfer data to and from memory units, such as external memory unit 106 and internal memory unit 108. Processor core 104 may initiate a transfer of data from external memory unit 106 to internal memory unit 108, but may not actually execute the data transfer itself. Instead, DMA controller 100 may execute the data transfer. While the transfer is being executed by DMA controller 110, processor core 104 may execute other operations for increased device 100 efficiency. Once the data transfer is complete, DMA controller 110 may send processor core 104 an interrupt. Processor core 104 may then access the data transferred by DMA controller 110 from internal memory unit 108. However, in other embodiments, DMA controller 110 need not be used and processor core 104 may execute the data transfer from internal to external memory.

Figure 2:
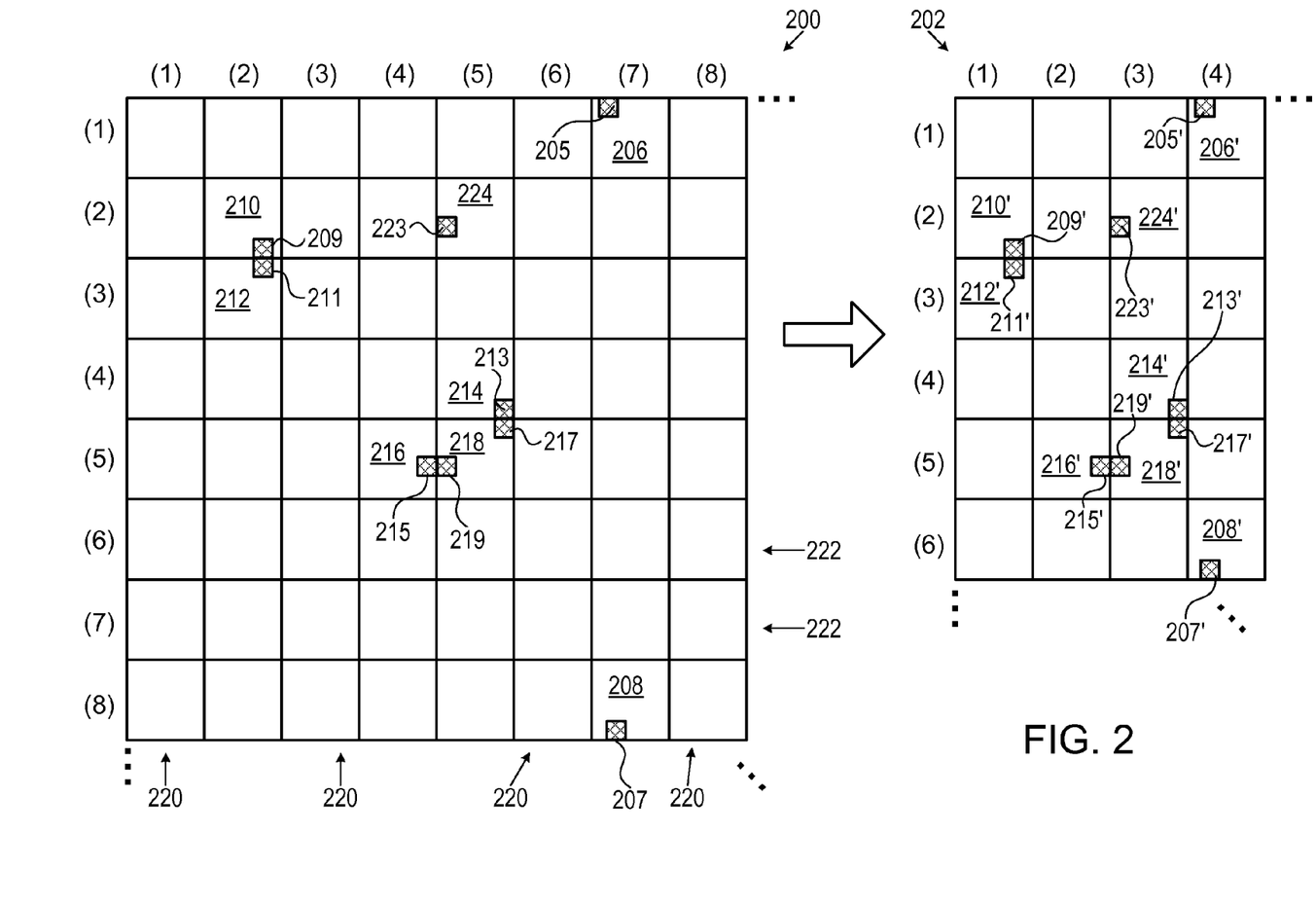
FIG. 2 is a schematic illustration of an initial data array and a collapsed data array for storing video and imaging data in accordance with embodiments of the invention.

Reference is made to FIG. 2, which is a schematic illustration of an initial data array 200 and a collapsed data array 202 for storing video and imaging data in accordance with embodiments of the invention.

An external memory (e.g., external memory unit 106 of FIG. 1) may store an initial data array 200. Initial data array 200 may represent a visual feature of an image, for example, texture, contrast, hue, intensity, translucency, an amount of red, green or blue for (RGB) images or cyan, magenta, yellow, and key (black) for (CMYK) images, etc. Each data element in data array 200 may provide a value of the visual feature for a corresponding pixel in the same position (e.g., or a corresponding shifted position) in a pixel array or sub-array of an image.

Data array 200 may be divided into a plurality of data blocks or sub-arrays. The size of each sub-array may be the size of a burst of data on a memory bus transferring data between internal and external memory. In the example shown in FIG. 2, data array 200 is a (512×512) data array (corresponding to a 512×512 pixel array) having (4096) sub-arrays, each sub-array being a (8×8) sub-array having (64) data elements.

The input data for a program or set of instructions may be a subset of data elements in data array 200. In some embodiments, only desired or targeted data blocks containing requested data elements (the input data to the program or instructions) may be transferred from external to internal memory. A processor (e.g., processor core 104 of FIG. 1) may use a direct memory access controller (e.g., DMA controller 110 of FIG. 1) to retrieve the data or alternatively, may retrieve the data directly.

To transform data elements from initial data array 200 to collapsed data array 202, the DMA controller (or processor) may position the retrieved subset of data blocks in collapsed data array 202 in the same relative position as in initial data array 200, omitting rows 222 and columns 220 of blocks from which no data elements were retrieved (rows and columns containing only non-requested data elements—rows (6) and (7) and columns (1), (3), (6) and (8) in FIG. 2). In one embodiment, each data block may be translated to collapsed data array 202 at a coordinate position (i-n,j-m) of horizontal (column) position (i-n) and vertical (row) position (j-m) that is the same coordinate position from which the data element was retrieved in initial data array 200 in external memory (i,j) less the number of omitted columns 220 ($n$) preceding the column (i) and omitted rows 222 ($m$) preceding the row (j) of the element (i,j) from initial data array 200.

Each data block in initial data array 200 containing one or more requested data elements, for example, data blocks 206, 208, 210, 212, 214, 216, 218, and 224 (containing respective requested data elements 205, 207, 209, 211, 213, 215, 217/219, and 223), may be translated to corresponding positions in collapsed data array 202 (e.g., the same vertical positions less the number of omitted rows 222 and the same horizontal positions less the number of omitted columns 220 preceding the row and column of the data element or block, for example, to data blocks 206', 208', 210', 212', 214', 216', 218' and 224' (containing respective requested data elements 205', 207', 209', 211', 213', 215', 217'/219' and 223'), respectively.

By omitting rows 222 and columns 220 of blocks with only non-requested data elements, the collapsed data array 202 as a whole may be reduced in size from the initial data array 200. For example, the width of collapsed data array 202 may be reduced by the number of columns (n) omitted from initial data array 200 and the height of collapsed data array 202 may be reduced by the number of rows (m) omitted from initial data array 200.

In the example, in FIG. 2, the first, third, sixth and eighth columns and the sixth and seventh rows from initial data array 200 are omitted in the translation to collapsed data array 202. For initial data array 200 having a height and width of (8×8) data blocks (e.g., 64×64 data elements), omitting two rows 222 of blocks may reduce the array height to 6 data blocks (e.g., 48 data elements) and omitting three columns 220 of blocks may reduce the array width to 4 data blocks (e.g., 32 data elements) to generate collapsed data array 202 of size (6×4) data blocks (e.g., 24 data blocks or 1536 data elements). The fewer data elements requested as input to the program, the greater the reduction in size and the smaller the collapsed data array 202.

A look-up table may provide a compact encoding of the transformation between initial data array 200 and collapsed data array 202. The look-up table may store the translation values of entire rows and columns between initial data array 200 and collapsed data array 202, for example, fully defining the translated position of data elements therebetween. The look-up table may record the number of columns (n) 220 and/or rows (m) 222 omitted in collapsed data array 202 for each horizontal position column (i) and vertical position row (j) in initial data array 200, respectively. In one embodiment, the look-up table may include separate tables or sub-tables for horizontal translations defined by omitted column 220 values (n) (for example, horizontal look-up table in (x) (LUTX)) and vertical translations defined by omitted row 222 values (m) (for example, vertical look-up table in (y) (LUTY)). For example, horizontal look-up table (LUTX) and vertical look-up table (LUTY) may be:

| LUTX | | LUTY | |
|---|---|---|---|
| 1 | — | 1 | 1 |
| 2 | 1 | 2 | 2 |
| 3 | — | 3 | 3 |
| 4 | 2 | 4 | 4 |
| 5 | 3 | 5 | 5 |
| 6 | — | 6 | — |
| 7 | 4 | 7 | — |
| 8 | — | 8 | 6 |

In another embodiment, a single look-up table may be used for both horizontal and vertical translations of both (x) and (y) coordinates.

Once the requested data elements are stored in collapsed data array 202 of internal memory (for example, by the DMA controller), the processor may retrieve the requested data elements as input into the requesting program or instructions. The program or instruction may indicate the external memory address of the requested input data element(s) (i,j) in the initial data array 200. Since the processor retrieves data elements from internal memory, the processor may identify the translated location of the data element in collapsed data array 202 using translation values in the look-up table. The processor may read translation entries (n) and (m) from horizontal look-up table (LUTX) for column (i) and vertical look-up table (LUTY) for row (j) of the data element position (i,j) in initial data array 200 of external memory. The processor may automatically retrieve a data block having data element (i-n, j-m) from collapsed data array 202, which is the translated location in collapsed data array 202 where the retrieved data element (i,j) from initial data array 200 is stored.

In one example, in FIG. 2, the processor may receive an instruction requesting, as input, a data element 205 from external memory, for example, at coordinate location (1,50) in initial data array 200. Requested data element 205 is in a data block 206 at the intersection of the first row (1) and seventh column (7) in initial data array 200 (e.g., dividing each element number by the block width (8) to compute the block number). The processor may read the horizontal translation entry from the horizontal look-up table (LUTX) for the column number (7) of the requested data block 206 and the vertical translation entry from the vertical look-up table (LUTY) for the row number (1) of the requested data block 206. The horizontal look-up table (LUTX) in the example hereinabove indicates that data elements retrieved from a data block from column number (7) in initial data array 200 are translated to a data block in column number (4) in collapsed data array 202. Similarly, the vertical look-up table (LUTY) in the example hereinabove indicates that data elements retrieved from a data block from row number (1) in initial data array 200 are not translated (or are translated by zero), and remain in the same row number (1) in collapsed data array 202. Accordingly, using only the two translation values (LUTX: column 7->4; LUTY: row 1->1) of the look-up table, the processor may identify that data block 206 (and data element 205 contained therein) retrieved from row (1), column (7) of initial data array 200 in external memory is translated to data block 206' (and data element 205' contained therein) positioned at the intersection of row (1), column (4) of collapsed data array 202 in internal memory. Data element 205' may have the same position within data block 206' in internal memory as data element 205 has within data block 206 in external memory, for example, first row, second column of each respective data block 206,206'. Accordingly, the processor may retrieve data block 206' positioned in the first block row, fourth block column of collapsed data array 202 and data element 205', which in turn is positioned in the first row, second column of data block 206'. The processor may input the retrieved data element 205' into the requesting program or set of instructions.

According to embodiments of the invention, collapsed data array 202 may retain the same neighboring requested data elements or blocks as in initial data array 200. Since collapsed data array 202 only omits non-requested data blocks, no neighboring requested data blocks may be omitted and since collapsed data array 202 only omits entire rows and columns, the boundaries and relative positioning between all neighboring requested data blocks may be preserved. For example, each pair of adjacent requested data elements contained in different data blocks in initial data array 200 (e.g., elements 209 and 211, elements 213 and 217, elements 215 and 219, and wrap-around elements 205 and 207) are maintained in the same adjacent pairs in collapsed data array 202 (e.g., elements 209' and 211', elements 213' and 217', elements 215' and 219', and wrap-around elements 205' and 207'), respectively. Accordingly, to execute instructions on data elements that cross the boundaries between neighboring data blocks in initial data array 200, the processor may execute the same (unaltered) operations on the same neighboring data elements in collapsed data array 202 (at uniformly translated locations).

Requested element 223 not neighboring other requested elements in initial data array 200 may also be retrieved and stored in collapsed data array 202, for example, adjacent to empty slots or new retrieved targeted blocks.

In conventional systems, elements initially neighboring in external memory may be stored apart in internal memory, for example, destroying neighboring data connectivity. In such conventional systems, program operations executed across multiple neighboring data blocks cannot be executed directly on the data from internal memory since the neighboring data relationships are lost during the transfer of data. Accordingly, conventional systems may use an additional layer of computation to stitch together separated elements to execute joined instructions thereon.

In contrast, according to embodiments of the invention, neighboring relationships are preserved and the original program operations may be executed directly across the multiple neighboring requested data blocks in internal memory. Since the requested elements neighboring in external memory are also neighboring in internal memory, no extra computations are needed to rejoin neighboring data elements. Accordingly, there is provided a system and method for transparent execution of program instructions requesting data elements from external memory spanning multiple neighboring data blocks, by inputting a corresponding translated set of multiple neighboring data blocks from internal memory.

Figure 3:
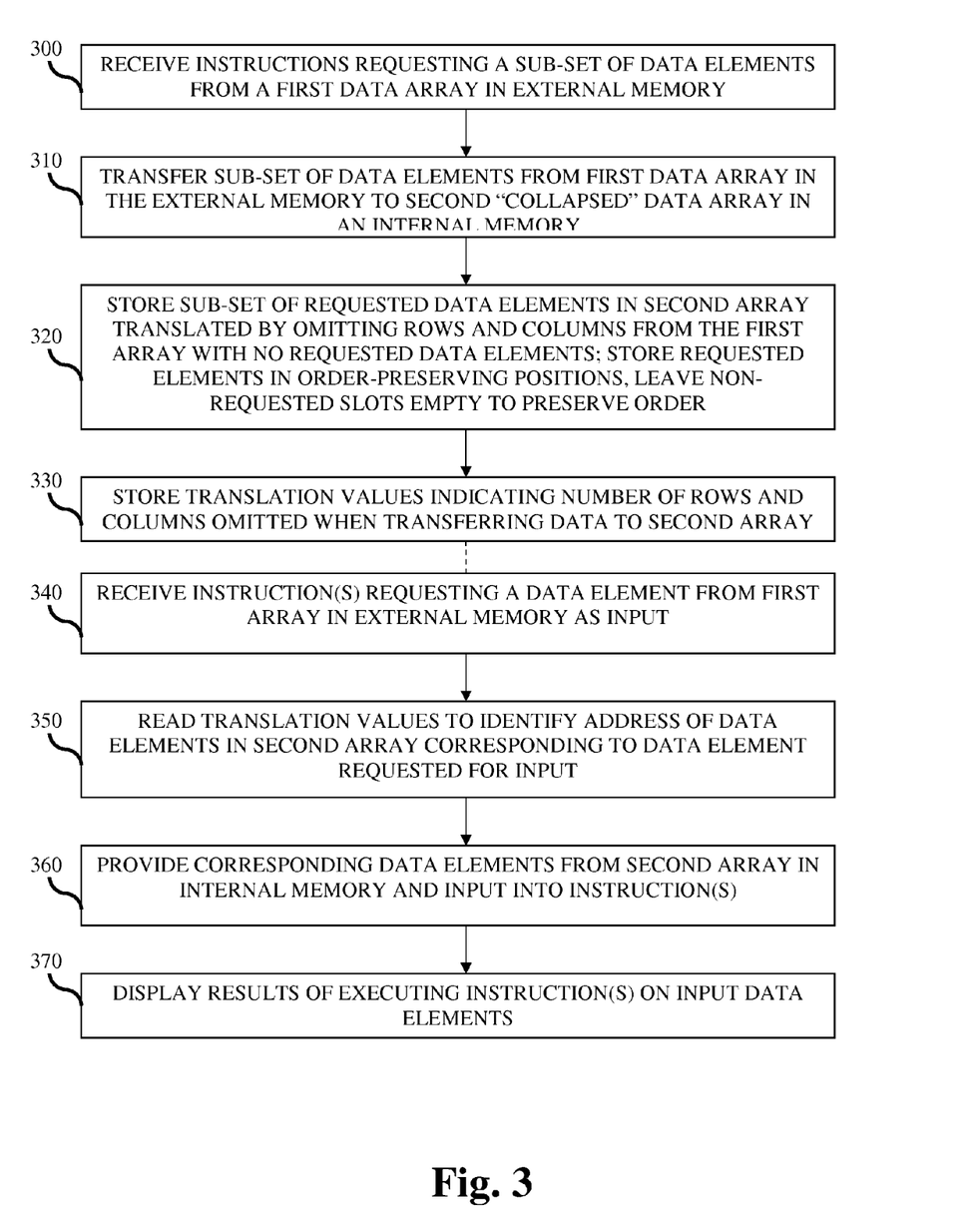
FIG. 3 is a flowchart of a method in accordance with embodiments of the invention.

Reference is made to FIG. 3, which is a flowchart of a method in accordance with embodiments of the invention. A system may include or use components of system 100 such as device 100 and processor core 104 of FIG. 1 to implement the method of FIG. 3.

In operation 300, a processor (e.g., processor core 104 of FIG. 1) may receive one or more program instructions requesting input data including a sub-set of data elements from a first data array (e.g., initial data array 200 of FIG. 2) in an external memory (e.g., external memory 106 of FIG. 1). In one example, the first data array may store values for a visual feature, such as, texture, for corresponding pixels in the same or corresponding position in a pixel array of an image.

In operation 310, the processor (e.g., via a DMA controller, such as DMA controller 110 of FIG. 1) may transfer the sub-set of data elements from the first data array in the external memory to a second "collapsed" data array (e.g., collapsed data array 202 of FIG. 2) in an internal memory (e.g., internal memory 108 of FIG. 1). When individual data elements are retrieved separately, the processor may transfer only the requested data elements and may not transfer the remaining sub-set of non-requested data elements. However, when groups of data elements are retrieved together in data blocks or sub-arrays, the processor may transfer only data blocks containing requested data elements, each of which may include at least some requested and possibly some non-requested data elements, but may not transfer blocks containing no requested and only non-requested data elements.

In operation 320, the processor (or DMA controller) may store the retrieved sub-set of requested data elements in the second array in a position translated from the position in the first array vertically by the number of omitted rows (e.g., omitted rows 222 of FIG. 2) and horizontally by the number of omitted columns (e.g., omitted columns 220 of FIG. 2). The second data array may store only requested elements (when individual elements are retrieved) or only blocks containing requested elements and coinciding non-requested data elements (when data blocks are retrieved). The sub-set of requested elements or blocks may be stored in the second array in the same order as neighbor-preserving position as in the first array, for example, translated by a shift due to the omitted rows and columns. The processor may leave non-requested slots in the second data array (e.g., translated from non-requested data elements or blocks in the first data array) empty, for example, to preserve the neighboring position of the requested data elements or blocks.

In one embodiment, the requested data elements may be stored in the second data array in a position translated from the position in the first data array by omitting the rows and columns with only non-requested data elements or blocks. For example, each requested data element may be stored in the second data array in a translated position (i-n,j-m) having a horizontal position (i-n) and vertical position (j-m) that is equal to the initial horizontal position (i) and vertical position (j) where the data element is stored in the first data array less a number of omitted columns (n) preceding the column number (i) of the initial horizontal position and omitted rows (m) preceding the row number (j) of the initial vertical position. The size of the height and width of the second data array (a-m and b-n) may be reduced from the size of the first data array (a,b), for example, by the number of omitted rows (m) and columns (n), respectively.

In operation 330, the processor may store translation value(s) indicating the number of the (full) rows and columns omitted in the second data array for translating elements from each row and column of the first data array. The processor may store translation value(s) in a look-up table.

Once the requested data elements are stored in the second collapsed data array in internal memory, in operation 340, the processor may receive an instruction requesting a data element at an initial position (i,j) from the first data array in external memory as input data. Since the processor retrieves data elements from internal memory, the processor may identify the corresponding translated location (i-n,j-m) of the requested data element in the second data array, for example, using the translation values stored in operation 330.

In operation 350, the processor may read the translation values for the number of entire columns (n) and rows (m) omitted in the second data array preceding column number (i) and row number (j) of the data element requested for input in the first data array to identify the address or horizontal and vertical positions (i-n,j-m), respectively, of the corresponding data element in the second data array in internal memory.

In operation 360, the processor may provide the data element stored at translated position (i-n,j-m) of second data array in internal memory as the input for the requesting program instruction.

In operation 370, an output device (e.g., output device 102 of FIG. 1) may display the results of executing the program or set of instructions on the input data elements. When the data elements include image data, the output device may display an image including a visual feature retrieved from one or more of the stored data elements in the second data array.

Other or different operations or orders of operations may be used and some operations may be skipped or combined.

According to embodiments of the invention, a new system, method and data structure is provided for retrieving a subset of data elements or blocks from an initial data array in external memory to a collapsed or compressed second array in an internal memory. The second array may include a number of rows and columns of the initial array, which has requested pixels and may exclude rows and columns without requested pixel. The second array may only store requested pixel elements or data blocks. All other slots in the second array corresponding to non-requested data elements may be left empty. These empty slots may preserve the relative ordering and neighboring relationship between retrieved pixels or data blocks without wasting memory resources for retrieving data elements that won't be used. Since entire rows and columns with no requested elements are omitted in the second data array, pairs of adjacent or neighboring requested data elements or blocks may retain the same neighboring requested data elements or blocks in the second data array as in initial data array.

According to embodiments of the invention, the processor or DMA controller may store each data block in the second collapsed data array in a location that preserves the relative positioning of the neighboring requested data blocks. Neighboring requested blocks and data elements of the initial data array are also neighboring in the second collapsed data array. That is, the second collapsed data array may preserve boundaries between requested data elements and blocks thereof (e.g., but not necessarily between non-requested data elements or between requested and non-requested data elements). By preserving boundaries between requested data elements, instructions, which only use the requested data elements, may be directly executed on the set of data elements that cross the boundaries or extend beyond one data block.

In contrast, conventional systems may retrieve requested data blocks stored at non-uniform intervals in the external memory array and may store them sequentially in an internal memory data array. Accordingly, different transformations may be used to transform the requested data elements in each data block. Instructions which operate on requested data elements across a plurality of data blocks may use a plurality of different transformations to locate the data elements in internal memory (e.g., a different transformation for each data block). Accordingly, conventional internal memory storage schemes may add an extra layer of computation to transform data between internal and external memories, whereas the internal memory storage scheme according to embodiments of the invention is seamless and transparent to program instructions (e.g., uses no extra computational steps to arrange neighboring blocks).

It should be appreciated by a person skilled in the art that although generally, collapsing an initial data array into a collapsed data array results in a smaller data array, in cases where a pixel is retrieved from at least one data block in every row and column, no rows or columns are omitted in the collapsed data array, resulting in a collapsed data array in internal memory of the same size as the initial data array in external memory.

It should be appreciated by a person skilled in the art that although embodiments of the invention describe omitting, excluding or collapsing row and columns with no requested data elements, other embodiments may omit only rows or only columns with no requested data elements. In yet another embodiment, rows and columns may be omitted with some, but less than a predetermined number of requested data elements. For example, a processor or programmer may set the predetermined number after determining that it is more computationally beneficial to delete a row or column than to preserve a small number of (e.g., one, two, ten) requested elements.

It should also be appreciated by a person skilled in the art that although data elements and arrays are described to be transferred from external/main to internal/local memories, data elements may also be transferred in the reverse direction, from internal to external memories, or between any other memory or storage units. For example, initial data array 200 and collapsed data array 202 of FIG. 2 may be stored in any memory or storage units.

It should be appreciated by a person skilled in the art that embodiments of the invention may be executed operating on individual data elements or on blocks of data elements. When operations are executed on data blocks, the blocks may include the requested data elements as well as non-requested data elements, grouped together. When blocks are used, columns, rows and data elements may refer to columns of blocks, columns of rows, or blocks containing data elements, respectively.

It should be appreciated by a person skilled in the art that although embodiments of the invention are described in reference to video or image data that any data having the same or similar digital structure but pertaining to different data types may be used. A similar digital structure may include data having sets of correlated or co-dependent values, sets that mutually or in combination describe the same data, or sets of individual dimension components of multi-dimensional data.

Embodiments of the invention may include an article such as a computer or processor readable medium, or a computer or processor storage medium, such as for example a memory, a disk drive, or a USB flash memory, encoding, including or storing instructions which when executed by a processor or controller (for example, processor 104 of FIG. 1), carry out methods disclosed herein.

Although the particular embodiments shown and described above will prove to be useful for the many distribution systems to which the present invention pertains, further modifications of the present invention will occur to persons skilled in the art. All such modifications are deemed to be within the scope and spirit of the present invention as defined by the appended claims.

The invention claimed is:

1. A method comprising, in a computing system:
   receiving one or more program instructions requesting input data comprising a sub-set of data elements from a first data array in an external memory;
   transferring the sub-set of data elements from the first data array in the external memory to a second data array in an internal memory;
   storing the retrieved sub-set of requested data elements in the second array in positions translated from the positions in the first array by a plurality of omitted rows and columns from the first data array from which no data elements are requested; storing values indicating the number of rows and columns omitted in the second data array for translating elements from each row and column of the first data array; receiving an instruction requesting a data element at an initial position (i,j) from the first data array in external memory as an input;
   reading the values for the number of columns (n) and rows (m) omitted in the second data array for translating the data element from column number (i) and row (j) in the first data array; and
   providing the data element at translated position (i-n,j-m) from second data array in internal memory as the input for the instruction.

2. The method of claim 1, wherein each requested data element is stored in the second data array in a translated position (i-n,j-m) that is the same initial position (i,j) where the data element is stored in the first data array less a number of omitted columns (n) preceding the column number (i) of the initial position and omitted rows (m) preceding the row number (j) of the initial position.

3. The method of claim 1, wherein a sub-set of data elements not requested by program instructions are not transferred from the external memory and slots in the internal memory second data array at positions translated from positions in the first array corresponding to the non-requested data elements are left empty.

4. The method of claim 1, wherein the size of the second data array is reduced from the size of the first data array by a height equal to the number of omitted rows (m) and a width equal to the number of omitted columns (n).

5. The method of claim 1, wherein requested data elements neighbouring other requested data elements in the first data array are neighbouring the same requested data elements in the second data array.

6. The method of claim 1, wherein the data elements are grouped into a plurality of multi-dimensional data blocks and data elements are transferred in groups of data blocks.

7. The method of claim 1, wherein the data elements are retrieved from the first data array by a direct memory access controller.

8. The method of claim 1, wherein the first data array stores values for a visual feature for corresponding pixels in the same position in a pixel array of an image.

9. The method of claim 8, comprising displaying the image including visual feature values retrieved from one or more of the data elements stored in the second data array.

10. A device comprising;
    a first memory storing a first multi-dimensional data array having a plurality of data elements;
    a second memory storing a second multi-dimensional data array having a plurality of data elements;
    a controller to receive an instruction to transfer a sub-set of the data elements of the first data array from the first memory to a second multi-dimensional data array in the second memory, wherein the controller is to store the retrieved sub-set of requested data elements in the second data array in positions translated from the positions of the elements in the first array by a plurality of omitted rows and columns from the first data array from which no data elements are requested; storing values indicating the number of rows and columns omitted in the second data array for translating elements from each row and column of the first data array; receiving an instruction requesting a data element at an initial position (Li) from the first data array in external memory as an input;
    reading the values for the number of columns (n) and rows (m) omitted in the second data array for translating the data element from column number (i) and row (i) in the first data array; and
    providing the data element at translated position (i-n,j-m) from second data array in internal memory as the input for the instruction.

11. The device of claim 10, wherein the first memory is an external memory and the second memory is an internal memory.

12. The device of claim 10, wherein the controller is a direct memory access (DMA) controller.

13. The device of claim 10, wherein the controller does not transfer a sub-set of data elements not requested by program instructions from the first memory and leaves slots empty in the second memory second data array at positions which were translated from positions in the first array corresponding to the non-requested data elements.

14. The device of claim 10, wherein the controller preserves in the second array the relative positions of neighbouring pairs of requested data elements from the first array.

15. The device of claim 10, wherein the controller groups the data elements into a plurality of multi-dimensional data blocks each containing a plurality of data elements and transfers a sub-set of the data blocks that contain the sub-set of requested data elements.

16. The device of claim 10, wherein the controller reduces the size of the second data array from the size of the first data array by a height equal to the number of omitted rows and a width equal to the number of omitted columns.

17. The device of claim 10, wherein the controller stores values in the first data array for a visual feature for corresponding pixels in the same position in a pixel array of an image.

18. The device of claim 10, comprising an output device to display the image including visual feature values retrieved from one or more of the data elements stored in the second data array.

* * * * *